(12) United States Patent
Fontana

(10) Patent No.: US 8,158,743 B2
(45) Date of Patent: Apr. 17, 2012

(54) ROSIN PHENOLIC RESINS FOR PRINTING INKS

(75) Inventor: Thomas A. Fontana, Jacksonville, FL (US)

(73) Assignee: Arizona Chemical Company, LLC, Jacksonville, FL (US)

( * ) Notice: Subject to any disclaimer, the term of this patent is extended or adjusted under 35 U.S.C. 154(b) by 0 days.

(21) Appl. No.: 11/741,536

(22) Filed: Apr. 27, 2007

(65) Prior Publication Data

US 2007/0251411 A1 Nov. 1, 2007

Related U.S. Application Data

(63) Continuation of application No. 10/384,075, filed on Mar. 5, 2003, now abandoned.

(51) Int. Cl.
*C08G 14/04* (2006.01)
*C08G 8/12* (2006.01)
*C08G 8/28* (2006.01)

(52) U.S. Cl. ............ 528/129; 528/158.5; 528/159; 528/161; 528/176; 528/195; 528/205; 528/212; 528/503; 525/54.45; 525/132; 525/133.5; 525/134; 106/31.13; 106/218; 106/219; 106/236; 106/500

(58) Field of Classification Search ............ 528/129, 528/158.5, 159, 161, 176, 195, 205, 212, 528/503; 525/54.45, 132, 133.5, 134; 106/31.13, 106/218, 219, 236, 500
See application file for complete search history.

(56) References Cited

U.S. PATENT DOCUMENTS

| | | |
|---|---|---|
| 2,007,983 A | 7/1935 | Rosenblum |
| 2,101,944 A | 12/1937 | Honel |
| 2,309,610 A * | 1/1943 | Burrell .................. 527/602 |
| 2,572,071 A | 10/1951 | St. Clair et al. |
| 2,750,296 A | 6/1956 | Curado et al. |
| 2,848,430 A | 8/1958 | Frey et al. |
| 3,531,302 A | 9/1970 | Horn |
| 3,674,732 A | 7/1972 | Pitzalis et al. |
| 3,880,788 A | 4/1975 | Rudolphy |
| 4,079,102 A | 3/1978 | Wagner et al. |
| 4,198,329 A | 4/1980 | Rudolphy et al. |
| 4,391,640 A | 7/1983 | Okoshi et al. |
| 4,528,036 A | 7/1985 | Rudolphy |
| 4,552,592 A | 11/1985 | Rudolphy et al. |
| 4,597,793 A | 7/1986 | Amon et al. |
| 4,639,492 A | 1/1987 | Makhlouf et al. |
| 4,725,384 A | 2/1988 | Du Vernet |
| 4,857,624 A | 8/1989 | DeBlasi et al. |
| 4,966,945 A | 10/1990 | Drawert et al. |
| 5,021,538 A | 6/1991 | Crews |
| 5,096,996 A | 3/1992 | Hesse et al. |
| 5,405,932 A | 4/1995 | Bender et al. |
| 5,423,908 A | 6/1995 | Crews et al. |
| 5,427,612 A | 6/1995 | Bender |
| 5,498,684 A | 3/1996 | Bender |
| 5,549,741 A | 8/1996 | Pennaz et al. |
| 5,556,454 A | 9/1996 | Bender |
| 5,597,884 A | 1/1997 | Bender |
| 5,698,668 A | 12/1997 | Bender |
| 5,708,078 A | 1/1998 | Bender et al. |
| 5,886,128 A | 3/1999 | West et al. |
| 5,969,071 A | 10/1999 | Matzinger |
| 6,022,947 A | 2/2000 | Frihart et al. |
| 6,153,693 A | 11/2000 | Matzinger et al. |
| 6,172,174 B1 | 1/2001 | Matzinger |
| 6,469,124 B2 | 10/2002 | Braat et al. |
| 6,469,125 B1 | 10/2002 | Fontana et al. |
| 6,875,842 B2 | 4/2005 | Fontana et al. |
| 2004/0181026 A1 | 9/2004 | Toyoda et al. |

FOREIGN PATENT DOCUMENTS

| | | |
|---|---|---|
| EP | 0362727 A2 | 4/1990 |
| EP | 0649889 A1 | 4/1995 |
| EP | 0666294 A2 | 8/1995 |
| EP | 0733684 A2 | 9/1996 |
| EP | 0733685 A2 | 9/1996 |
| EP | 0955325 A1 | 11/1999 |
| JP | 62-260810 | 11/1987 |
| JP | 09-169912 | 6/1997 |
| WO | 98/58002 | 12/1998 |
| WO | WO 98/58002 | * 12/1998 |
| WO | 03/082984 A1 | 10/2003 |

OTHER PUBLICATIONS

Office Action dated May 19, 2004 as issued in U.S. Appl. No. 10/384,075, filed Mar. 5, 2003.
Notice of Allowance dated Nov. 18, 2004 as issued in U.S. Appl. No. 10/384,075, filed Mar. 5, 2003.
Office Action dated Jul. 14, 2005 as issued in U.S. Appl. No. 10/384,075, filed Mar. 5, 2003.
Final Office Action dated Oct. 27, 2006 as issued in U.S. Appl. No. 10/384,075, filed Mar. 5, 2003.
Office Action dated Nov. 3, 2004 as issued in U.S. Appl. No. 10/654,661, filed Sep. 3, 2003.
Office Action dated Sep. 14, 2005 as issued in U.S. Appl. No. 10/654,661, filed Sep. 3, 2003.
Office Action dated Jun. 9, 2006 as issued in U.S. Appl. No. 10/654,661, filed Sep. 3, 2003.
Final Office Action dated Feb. 28, 2007 as issued in U.S. Appl. No. 10/654,661, filed Sep. 3, 2003. Office Action dated Dec. 24, 2008 as issued in U.S. Appl. No. 11/845,410, filed Aug. 27, 2007.
Final Office Action dated Oct. 7, 2009 as issued in U.S. Appl. No. 11/845,410, filed Aug. 27, 2007.
Office Action dated Apr. 15, 2010 as issued in U.S. Appl. No. 11/845,410, filed Aug. 27, 2007.
Final Office Action dated Dec. 9, 2010 as issued in U.S. Appl. No. 11/845,410, filed Aug. 27, 2007.

* cited by examiner

Primary Examiner — Duc Truong

(57) ABSTRACT

Rosin modified phenolic resins are prepared by reacting together rosin, fatty acid, phenol and aldehyde. The fatty acid may be Monomer (derived from the fatty acid dimerization process). The reaction mixture may optionally include α,β-olefinically unsaturated carboxylic acid(s) or anhydride(s), and polyol(s). The resin may be dissolved in a solvent to form a varnish. The resin may be used as a component of inks for lithographic or gravure printing.

27 Claims, No Drawings

ROSIN PHENOLIC RESINS FOR PRINTING INKS

RELATED APPLICATION DATA

This application is a continuation of U.S. patent application Ser. No. 10/384,075, filed Mar. 5, 2003 now abandoned, which is hereby incorporated by reference.

BACKGROUND OF THE INVENTION

1. Field of the Invention

This invention is directed to resins made from rosin, fatty acid, phenolic compound and aldehyde, where the resins are particularly useful in inks for lithographic and gravure printing.

2. Description of the Related Art

The use as a major component in the preparation of binders for printing inks is very well known in the art. Such rosin-based inks are used for a wide variety of printing processes, including flexography, gravure printing, letterpress printing, and lithography. Each printing process requires an ink with properties specific for optimal usage of that particular process, where relevant ink properties include viscosity, solvent evaporation, wettability, pigment dispersion, and compatibility with the other materials composing the ink press. In order to use rosin in inks having such diverse range of necessary performance properties, it is very important to select the appropriate materials to react with the rosin to form the ink binder. See, e.g., Roger F. Burke, "Rosin-based Printing Inks," *Naval Stores, Chapter* 19, Pulp Chemicals Association (1989), The following references describe some of the rosin-based phenolic resins known in the art.

U.S. Pat. Nos. 6,172,174 (2001) and 5,969,071 (1999) to Matzinger, disclose phenolic rosin resins useful in lithographic printing inks. The resins of Matzinger were prepared without the addition of antifoaming agents and with a reduction in the emission of aldehyde vapors compared to that commonly known in the art.

European Patent No. EP 1 054 028 (2000), to Matzinger, provides hydrocarbon/acrylic hybrid resins for adhesives, inks, and coating compositions. Dicyclopentadiene is a necessary component for the resin compositions disclosed.

U.S. Pat. No. 5,498,684 (1996), to Bender, provides rosin-based phenolic resins as binders for ink formulations. The Bender resins reportedly remain stable after at least six months of continuous air exposure.

Production cost is an important consideration in the preparation of rosin-based ink binders. It is well known to those experienced in the art that the natural resins and resin acids normally utilized in the production of printing inks are a relatively expensive component of the ink binder. This expense is further compounded by the realization that the global supply of natural rosin is rapidly decreasing.

Health hazard is another important consideration in the preparation of rosin phenolic ink binders. It is well-known in the art to incorporate alkylphenol, particularly nonylphenol, as a component in preparing certain rosin-based ink binders. However, recent literature abounds with reports of possible adverse endocrine disruption effects to humans, domesticated animals, and wildlife, resulting from the release of nonylphenol and other alkylphenols into water sources (see, e.g., T. Sweeney, "Is Exposure to Endocrine Disrupting Compounds During Fetal/Post-Natal Development Affecting the Reproductive Potential of Farm Animals?" *Domest. Anim. Endocrinol.*, vol. 23, pp. 203-209 (2002); C. Sonnenschein and A. M. Soto, "An Updated Review of Environmental Estrogen and Androgen Mimics and Antagonists," *J. Steroid Biochem. Mol. Bio.*, vol. 65, pp. 143-150 (1998)). In addition to the effect of these phenolic compounds on overall human and animal health, these findings could ultimately cause the cost of alkylphenols, and specifically nonylphenol, to increase dramatically as commercial manufacturers continue to move away from producing these chemicals, thereby diminishing global supply. In a worst-case scenario nonylphenol could even be banned altogether.

The present invention addresses the problems associated with the use of alkylphenols in the preparation of rosin-containing ink resins, and provides further related advantages as described herein.

BRIEF SUMMARY OF THE INVENTION

In brief, the present invention is directed to new resins, and the use of these resin in printing processes. For instance, these resins may be used for the construction of varnishes and inks, preferably equal to or superior in performance to those in commerce today. The present invention also provides resins formed from chemical components perceived to be less hazardous to humans than certain chemical components typically used in the art.

Rosin modified phenolic resins of the present invention are prepared by reacting together rosin, fatty acid, phenol and aldehyde. The fatty acid may be Monomer (derived from the fatty acid dimerization process). The reaction mixture may optionally include $\alpha,\beta$-olefinically unsaturated carboxylic acid(s) or anhydride(s), and polyol(s). The resin may be dissolved in a solvent to form a varnish. The resin may be used as a component of inks for lithographic or gravure printing.

In one aspect, the present invention provides resin produced by a process, the process comprising reacting resin-forming components at elevated temperature, the components comprising rosin, fatty acid, phenolic compound, and aldehyde. Optionally, all of the phenolic compound is phenol. Alternatively, the phenolic compound is a mixture of phenolic compounds, where one of the phenolic compounds is phenol. When the phenolic compound is a mixture of phenolic compounds, then in various embodiments of the invention, phenol constitutes at least 25 wt %, or at least 30 wt %, or at least 35 wt %, or at least 40 wt %, or at least 45 wt %, or at least 50 wt %, or at least 55 wt %, or at least 60 wt %, or at least 65 wt %, or at least 70 wt %, or at least 75 wt %, or at least 80 wt %, or at least 85 wt %, or at least 90 wt %, or at least 95 wt % of the total weight of the mixture of phenolic compounds, where "or at least" in reference to each of the wt % values is meant to include 100%.

In another aspect, the present invention provides a resin produced by a process, the process comprising reacting resin-forming components at elevated temperature, the components comprising rosin, fatty acid, phenolic compound, and aldehyde. In this aspect of the invention, the fatty acid constitutes at least 30 wt % of the total weight of the resin-forming components. In various embodiments, the fatty acid constitutes at least 32 wt %, or at least 34 wt %, or at least 36 wt %, or at least 38 wt %, or at least 40 wt %, or at least 42 wt %, or at least 44 wt %, or at least 46 wt %, or at least 48 wt %, or at least 50 wt % of the total weight of the resin-forming components. In various other embodiments, in addition to the specification of the amount of fatty acid as set forth above, and for each of the specifications of the amount of fatty acid as set forth above (i.e., for each of 30, 32, 34, 36 etc. wt %), the resin is additionally described by the amount of phenol that is present among the resin-forming components. In one embodiment, phenol is the only phenolic compound used to form the resin. In related embodiments, phenol constitutes at least 5 wt %, or at least 10 wt %, or at least 15 wt %, or at least 20 wt %, or at least 25 wt %, or at least 30 wt %, or at least 35 wt %, or at least 40 wt %, or at least 45 wt %, or at least 50 wt %, or at least 55 wt %, or at least 60 wt %, or at least 65 wt %, or at least 70, wt %, or at least 75 wt %, or at least 80 wt %, or at least 85 wt %, or at least 90 wt %, or at least 95 wt % of the total weight of the mixture of phenolic compounds.

In another aspect, the present invention provides a resin produced by a process, the process comprising reacting resin-forming components at elevated temperature, the components comprising rosin, fatty acid, phenolic compound, and aldehyde. In this aspect of invention, some or all of the fatty acid is Monomer. In one embodiment, all of the fatty acid used to form the resin is Monomer. In a related embodiment, the fatty acid is a mixture of fatty acids, where at least some of that mixture comes from Monomer.

In another aspect, the present invention provides a resin produced by a process, the process comprising reacting resin-forming components at elevated temperature, the components comprising rosin, fatty acid, phenolic compound, and aldehyde. In three separate embodiments of this aspect of the invention, i) at least some of the fatty acid is branched-chain monocarboxylic acid; ii) at least some of the fatty acid is cyclic-chain fatty acid; iii) at least some of the fatty acid is branched-chain fatty acid, and at least some of the fatty is cyclic-chain fatty acid. In a preferred embodiment, at least some of the fatty acid is Monomer, where Monomer includes both branched-chain fatty acid and cyclic-chain fatty acid. Again, in a preferred, but optional embodiment, some or all of the phenolic compound is phenol. Thus, for each of the embodiments i), ii), and iii), the present invention optionally provides that all of the phenolic compound used to form the resin is phenol. In addition, for each of the embodiments i), ii), and iii), the present invention optionally provides that phenol constitutes at least 5 wt %, or (in additional embodiments) at least 10 wt %, or at least 15 wt %, or at least 20 wt %, or at least 25 wt %, or at least 30 wt %, or at least 35 wt %, or at least 40 wt %, or at least 45 wt %, or at least 50 wt %, or at least 55 wt %, or at least 60 wt %, or at least 65 wt %, or at least 70 wt %, or at least 75 wt %, or at feast 80 wt %, or at least 85 wt %, or at least 90 wt %, or at least 95 wt % of the total weight of the mixture of phenolic compounds used to form the resin.

Optional reactants that may be included to prepare a resin of the invention include α,β-olefinically unsaturated carbonyl compound, for example, maleic anhydride, and/or polyol, for example, pentaerythritol. As stated above, a preferred phenolic compound is phenol. A preferred aldehyde is paraformaldehyde. Another optional resin-forming component is an alkaline metal salt, e.g., an alkaline metal salt wherein the cation of said salt is divalent. Suitable rosins for the invention include tall oil rosin, gum rosin, wood rosin, and combinations thereof.

In another embodiment, the present invention provides a lithographic ink resin produced by an improved process, the process comprising reacting the components as described above, and elsewhere herein, at elevated temperature so as to produce a lithographic ink resin of the present invention.

In another embodiment, the present invention provides a gravure ink resin produced by an improved process, the process comprising reacting the components as described above, and elsewhere herein, at elevated temperature so as to produce the gravure ink resin of the present invention.

In another embodiment, the present invention provides a varnish that includes a resin produced by the processes described herein, and a suitable solvent. Suitable solvents are aromatic hydrocarbons, e.g., benzene, toluene and xylene. The varnish has a percent resin solids, where that percentage is typically in the range of 25-50%, on weight basis.

In another aspect, the present invention provides a printing ink comprising pigment and a resin of the present invention, optionally formulated for gravure or lithographic printing.

These and other aspects of this invention will become apparent upon reference to the following detailed description.

DETAILED DESCRIPTION OF THE INVENTION

The present invention provides for the preparation of resins useful as binders in printing inks. In one aspect, the resins of the present invention are characterized in terms of the process by which they are made. In particular, the resins are characterized herein in terms of the reactants, also referred to as the components that are reacted together to form the product resin. It has been surprisingly discovered that resins with excellent solubility in aliphatic solvents can be obtained by utilizing phenol in combination with fatty acid, rosin and aldehyde; or by utilizing highly branched or cyclic fatty acid along with rosin, phenolic compounds and aldehyde, in the preparation of a resin. As discussed in further detail below, in a preferred embodiment, a resin of the present invention is prepared from rosin, phenol, branched and/or cyclic fatty acid, and aldehyde.

Reactants

In one aspect the resin of the present invention is prepared from resin-forming components (reactants) that include rosin, fatty acid, phenolic compound and aldehyde, with at least one of the following criteria being met:

a) the fatty acid comprises branched-chain fatty acid;
b) the fatty acid comprises cyclic-chain fatty acid; and
c) the phenolic compound is, or includes, phenol.

In other words, in seven different and distinct aspects of the invention, the resin is prepared from rosin, fatty acid, phenolic compound and aldehyde, such that a); or such that b); or such that c); or such that a) and b); or such that a) and c); or such that b) and c); or such that a) and b) and c), where each of a), b) and c) are defined above. As discussed in detail elsewhere herein, in various embodiments of the invention, it may be further required that a minimum amount of a specified component is present among the resin-forming components.

Before further describing the resin of the invention and the process by which it may be prepared, each of the necessary reactants, and many optional reactants, will be described.

Rosin

Rosin is a well-known, commercially available material. In terms of its chemical structure, it is mainly a mixture of $C_{20}$, tricyclic fused-ring, mono-carboxylic acids, typified by abietic acid. Individually, these monocarboxylic acids are referred to as resin acids. In combination, they are commonly referred to as rosin. Rosin can be obtained from many sources, and can have a wide range of purities. For example, wood rosin is obtained from Pinus stumps after harvesting the stumps, chipping the stumps into small chips, extracting the chips with hexane or higher-boiling paraffins, and distilling the hexane or paraffin and fatty acids to yield wood rosin. Gum rosin is the name given to rosin that is obtained after scoring a pine tree, collecting the exudate sap, and then distilling away the volatile components and most of the fatty acids.

The Kraft wood pulping process, also known as the sulfate pulping process, produces tall oil as a byproduct of the paper-making process. According to this process, pinewood is digested with alkali and sulfide, producing tall oil soap and crude sulfate turpentine as by-products. Acidification of this soap followed by fractionation of the crude tall oil yields rosin and fatty acid as two of the components. The rosin obtained by this process is known as tall oil rosin (TOR) and the fatty acid obtained by this process is known as tall oil fatty acid (TOFA).

For clarity, it will be noted that as the term is used herein, "rosin" refers to rosin from any source, including tall oil rosin (by-product from wood pulping process), gum rosin (obtained by scoring trees and collecting/refining the exudate) and wood rosin (obtained from pine stumps by extractive and/or distillative methods). The term "rosin" also includes treated rosin, where treated rosin refers to rosin that has been subjected to disproportionation and/or hydrogenation conditions. The term "rosin" also includes dimerized rosin. Each of disproportionated, hydrogenated and dimerized rosin is well known in the art.

Rosin is typically characterized by its acid number, and rosins having acid numbers ranging from about 160 to about 180 are preferred according to the invention. Preferably, the tall oil rosin has undergone distillation so as to have less than about 5 weight percent tall oil fatty acids. A preferred rosin is available commercially from Arizona Chemical Company, Jacksonville, Fla., under the SYLVAROS® trademark.

Optionally, the rosin can be characterized in terms that describe the source of at least 90% of the total weight of the rosin. For example, in one aspect of the invention, tall oil rosin provides at least 90% of the weight of the rosin used to prepare a resin of the invention. In one aspect, a mixture of gum rosin and tall oil rosin is used to form the resin of the invention.

The rosin typically contributes 1-85 wt % of the total weight of the components used to form the resin. In optional embodiments, rosin contributes up to 85 wt %, or up to 80 wt %, or up to 75 wt %, or up to 70 wt %, or up to 65 wt %, or up to 60 wt %, or 10-85 wt %, or 10-80 wt %, or 10-75 wt %, or 10-70 wt %, or 10-65 wt %, 10-60 wt %, or 20-85 wt %, or 20-80 wt %, or 20-75 wt %, or 20-70 wt %, or 20-65 wt %, or 20-60 wt %, or 20-85 wt %, or 25-80 wt %, or 25-75 wt %, or 25-70 wt %, or 25-65 wt %, or 25-60 wt %, or 30-85 wt %, or 30-80 wt %, or 30-75 wt %, or 30-70 wt %, or 30-65 wt %, or 30-60 wt %, or 35-85 wt %, or 35-80 wt %, or 35-75 wt %, or 35-70 wt %, or 35-65 wt %, or 35-60 wt %, or 40-85 wt %, or 40-80 wt %, or 40-75 wt %, or 40-70 wt %, or 40-65 wt %, or 40-60 wt %, or 45-85 wt %, or 45-80 wt %, or 45-75 wt %, or 45-70 wt %, or 45-65 wt %, or 45-60 wt % of the total weight of the components used to form a resin of the invention. In a preferred embodiment, the rosin contributes about 45-60 wt % of the total weight of the components used to form the resin.

Fatty Acid

The term fatty acid refers to chemicals of the formula $R^1$—COOH, as well as the salts thereof, where $R^1$ is a hydrocarbon group of at least six carbons. The term hydrocarbon refers to any molecular structure containing only hydrogen and carbon atoms. The hydrocarbon group may be saturated (i.e., contains no double or triple carbon-carbon bonds) or unsaturated (i.e., contains at least one double or triple carbon-carbon bond), with no limitation on the number of unsaturations. $R^1$ may independently be characterized by its hydrocarbon chain configuration as linear, branched, or cyclic.

Although the terms "linear", "branched" and "cyclic" are well known to one of ordinary skill in the art, for additional clarity illustrative examples of a C8 fatty acid having a linear- (structure (1)) branched- (structure (2)) and cyclic-(structure (3)) chain hydrocarbon group are shown below:

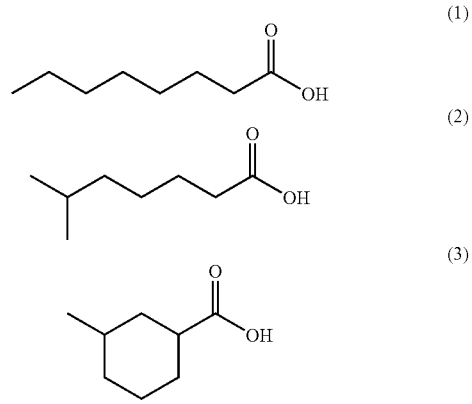

Fatty acids wherein $R^1$ is a chain of at least 14 carbon atoms are frequently known as "long-chain monocarboxylic acids" or "long-chain fatty acids." In one aspect of the present invention, the fatty acid used to prepare a resin of the invention is, or includes, long-chain fatty acid. Exemplary long-chain fatty acids include saturated acids such as, without limitation, capric, lauric, myristic, palmitic, stearic, hydroxystearic, and arachidic acids; and unsaturated acids such as, without limitation, oleic, linoleic, linolenic, and arachidonic acids; and mixtures thereof. In a preferred aspect, the fatty acid components include branched-chain fatty acid, or cyclic-chain fatty acid, or a combination of branched-chain and cyclic-chain fatty acids. In an optional aspect, the fatty acid component further comprises linear-chain fatty acid.

As used herein, "alkyl" refers to a monovalent hydrocarbon radical group (i.e., a hydrocarbyl monovalent radical) containing exclusively C—C and C—H single bonds, while "hydrocarbon" refers to any molecular structural domain containing exclusively carbon and hydrogen atoms; "alkenyl" refers to a hydrocarbyl monovalent radical containing at least one C═C double bond, while alkynyl refers to a hydrocarbyl monovalent radical containing at least one C≡C triple bond.

Fatty acid may be obtained from either natural sources or by synthetic means. Fatty acids may be obtained from plants (e.g., corn, safflower, and other vegetable oil) and animals (e.g., fish oil, lard). Fatty acid may also be obtained via the oxidation of petroleum-derived materials, e.g., the oxidation of short polyethylene molecules. Genetically-modified plants and animals, which may be considered either natural sources or synthetic sources, may also yield fatty acids. Either synthetic or natural fatty acid may be used as a reactant component in the present invention. In one aspect of the invention, the fatty acid is vegetable-derived, i.e., comes from vegetable oil. In another aspect, the fatty acid is tree-derived, e.g., tall oil fatty acid.

In one aspect of the present invention, the fatty acid component is, or includes, Monomer. While Monomer is well known in the art, for additional clarity the production of a preferred Monomer of the invention will be briefly summarized, starting with the wood pulping process. The digestion of wood to make pulp leads to the formation of black liquor. Black liquor is composed of, among other things, rosin soap and fatty acid soap. After the fatty acid soap has been acidified, it is known as tall oil fatty acid (TOFA). TOFA is composed mainly of $C_{16-18}$ carboxylic acids, which are largely unsaturated in their hydrocarbon chain structure. Exemplary tall oil fatty acids include unsaturated acids such as oleic acid, oleic acid isomers, linoleic acid, and linoleic acid isomers, as well as small percentages of saturated fatty acid such as stearic acid.

Due to its high content of unsaturated fatty acid, TOFA may be, and commonly is, subjected to acidic clay catalyzed polymerization. In this polymerization process, which is typically conducted at high temperatures the olefinic fatty acids undergo intermolecular addition reactions, by, e.g., the ene-reaction, so as to form polymerized fatty acid. The mechanism of this reaction is complex and incompletely understood at the present time. However, for purposes of the present invention it will suffice to note that the product of this polymerization process comprises, in large part, dimerized fatty acid and a unique mixture of monomeric fatty acids. This polymerization product is commonly (in commercial settings) subjected to distillation in order to provide a fraction highly enriched in dimerized fatty acid, which is commonly known in the art as "dimer acid" or "dimer fatty acid". This distillation process will also provide a fraction that is highly enriched in the monomeric fatty acids, where this fraction is commonly known in the art as "monomer" or "monomer acid" or "monomer fatty acid," and will be referred to herein as Monomer (with a capital M).

Monomer is a unique composition. Whereas the natural source-derived TOFA largely consists of linear $C_{18}$ unsaturated carboxylic acids, principally oleic and linoleic acids, Monomer contains relatively small amounts of oleic and linoleic acids, and instead contains significant amounts of branched and cyclic $C_{18}$ acids, both saturated and unsaturated, as well as elaidic acid. For example, a typical commercially-available Monomer contains ca. 30% C18 branched chain fatty acid (including saturated and unsaturated fatty acids) and 10% C18 cyclic chain fatty acid. The more diverse and significantly branched composition of Monomer results from the thermal catalytic processing carried out on TOFA by the polymerization process just described.

While a preferred Monomer used in the present invention is derived from TOFA, unsaturated fatty acids from any other source may likewise be subjected to a polymerization process that yields dimer fatty acid and a residual mixture of monomeric fatty acid known as Monomer. For instance, unsaturated fatty acids from vegetable oils may be subjected to a dimerization process, from which dimer acid and Monomer may be obtained. Likewise, unsaturated fatty acids may be produced by microorganisms, e.g., bacteria, and from animal products/byproducts (e.g., fish oils).

Monomer has been assigned CAS Registry Number 68955-98-6. A suitable Monomer for the practice of the present invention is CENTURY® MO-6 specialty fatty acid, as available from Arizona Chemical Company (Jacksonville, Fla.). This product is a light-colored semi-solid, having an acid number of 180, a saponification number of 187, and iodine number of 75, and a viscosity of 35 centistokes at 40° C. In a preferred aspect of the present invention, the fatty acid of the resin-forming composition is Monomer.

The art recognizes that the reaction of Monomer with other chemical substances yields unique, identifiable derivative substances that are chemically different from corresponding TOFA derivatives. In fact, it has been surprisingly found that resins of the present invention comprising Monomer exhibit properties of ink binder performance superior to those demonstrated by resins comprising TOFA.

Optionally, all of the fatty acid utilized in the process is Monomer, in other words, 100% of the fatty acid is Monomer. However, in other aspects of the invention, less than all of the fatty acid is provided by Monomer. For instance, in one aspect, 95% of the fatty acid is Monomer. The following are various optional means for characterizing the fatty acid according to the present invention: 100% of the fatty acid is Monomer; at least 95% of the fatty acid is Monomer; at least 90% of the fatty acid is Monomer; at least 85% of the fatty acid is Monomer; at least 80% of the fatty acid is Monomer; at least 75% of the fatty acid is Monomer; at least 70% of the fatty acid is Monomer; at least 65% of the fatty acid is Monomer; at least 60% of the fatty acid is Monomer; at least 55% of the fatty acid is Monomer; at least 50% of the fatty acid is Monomer; at least 45% of the fatty acid is Monomer; at least 40% of the fatty acid is Monomer; at least 35% of the fatty acid is Monomer; at least 30% of the fatty acid is Monomer; at least 25% of the fatty acid is Monomer; at least 20% of the fatty acid is Monomer; at least 15% of the fatty acid is Monomer; at least 10% of the fatty acid is Monomer. The percent values are weight percentages based on the total weight of fatty acid.

In a very surprising discovery, the present inventors have found that enhanced aliphatic solubility can be obtained by using branched-chain fatty acids and/or cyclic-chain fatty acids (in lieu of the standard linear-chain fatty acids that are found in TOFA) in the preparation of a rosin-phenolic resin. Thus, in a preferred embodiment, Monomer is used as a resin-forming component.

Optionally, the fatty acid is a mixture of Monomer and TOFA. In another optional embodiment, the fatty acid is entirely TOFA. In another optional embodiment, the fatty acid is, in part TOFA, and is, in part, a non-TOFA fatty acid, e.g., a vegetable oil-derived fatty acid.

In various aspects of the present invention, fatty acid is up to 65%, or up to 50%, or up to 40%, or up to 30%, or up to 25%, or 1-65%, or 1-50%, or 1-40%, 1-30%, or 1-25%, or 5-65%, or 5-50%, or 5-40%, 5-30%, or 5-25%, or 10-65%, or 10-50%, or 10-40%, 10-30%, or 10-25%, or 15-65%, or 15-50%, or 15-40%, 15-30%, or 15-25%, of the total weight of the resin-forming composition, where for each of these ranges, Monomer may be all of the fatty acid, or may be any fraction of the fatty acid as set forth in the previous paragraph. In a preferred embodiment, fatty acid constitutes about 15-25 wt % of the total weight of the resin-forming components.

Phenolic Compound

Phenolic compounds suitable for use as a component of the resin-forming composition of the invention include, without limitation, phenol, $C_{1-12}$ alkylphenols, arylphenols, aralkylphenols, cresols, 1,3,5-xylenols, diphenylolpropane, cumylphenol, and the like. As used herein, "aryl" refers to a monovalent radical of an aromatic structure; and "aralkyl" refers to an alkyl group substituted in at least one position by an aromatic structure.

In one aspect, the resin of the present invention is essentially free of alkylphenols, and particularly nonylphenol, a substance currently under global scrutiny as a possible endocrine disrupter. For example, in one embodiment, phenol is the only phenolic compound used to prepare a resin of the invention. In another embodiment, phenol constitutes at least 98% by weight of the total weight of phenolic compound used to prepare a resin of the present invention. In other embodiments of the invention, phenol constitutes at least 5 wt %, or (in additional embodiments) at least 10 wt %, or at least 15 wt %, or at least 20 wt %, or at least 25 wt %, or at least 30 wt %, or at least 35 wt %, or at least 40 wt %, or at least 45 wt %, or at least 50 wt %, or at least 55 wt %, or at least 60 wt %, or at least 65 wt %, or at least 70 wt %, or at least 75 wt %, or at least 80 wt %, or at least 85 wt %, or at least 90 wt %, or at least 95 wt % of the total weight of the mixture of phenolic compounds used to form the resin.

Although alkylphenols present health concerns, they are commonly used in the preparation of rosin-phenolic resins because the alkyl chain imparts needed aliphatic solvent compatibility to the resin. That is, in order for the resin to be commercially viable, it must be soluble in the types of solvents that are utilized for the target ink, typically either lithographic or gravure ink. In these types of ink, the resins must be soluble in aliphatic solvent. In order to achieve this aliphatic solvent solubility, ink resins that utilize rosin and phenolic compounds typically turn to alkyl phenols because the presence of the alkyl group is thought to provide or enhance that needed aliphatic solvent solubility.

In a very surprising discovery, the present inventors have found that it is not necessary to include alkyl phenol in a resin-forming reaction, in order for the resin to have the necessary aliphatic solvent solubility. Instead, phenol itself may be used in lieu of some, or even all, of the alkyl phenol commonly used in resin-forming reactions, so long as the resin-forming components also include fatty acid.

In various aspects of the present invention, phenolic compound is up to 50%, or up to 40%, or up to 30%, or up to 20%, or 1-15%, or 1-50%, or 1-40%, or 1-30%, or 1-20%, or 1-15%, or 2-50%, or 2-40%, or 2-30%, or 2-20%, or 2-15%, or 3-50%, or 3-40%, or 3-30%, or 3-20%, or 3-15%, or 4-50%, or 4-40%, or 4-30%, or 4-20%, or 4-15%, or 5-50%, or 5-40%, or 5-30%, or 5-20%, or 5-15% of the total weight of the resin-forming components. In additional aspects of the invention, for each of these percentage ranges, phenol may constitute 0-100%, or any of the ranges set forth above, of the phenolic compound. In a preferred embodiment, the phenolic component contributes about 5-15 wt % of the total weight of the resin-forming components.

In various aspects of the invention, when phenol constitutes 100% of the phenolic compound present in the reactant components, the fatty acid constitutes at least 5 wt %, or at least 10 wt %, or at least 15 wt %, or at least 20 wt %, or at least 25 wt %, or at least 30 wt %, or at least 40 wt % of the reactant components. In other aspects, when phenol constitutes at least 85 wt % of the phenolic compound present among the reactant components, the fatty acid constitutes at least 5 wt %, or at least 10 wt %, or at least 15 wt %, or at least 20 wt %, or at least 25 wt %, or at least 30 wt %, or at least 40 wt % of the reactant components. In other aspects, when phenol constitutes at least 80 wt % of the phenolic compound present among the reactant components, the fatty acid constitutes at least 5 wt %, or at least 10 wt %, or at least 15 wt %, or at least 20 wt %, or at least 25 wt %, or at least 30 wt %, or at least 40 wt % of the reactant components. In other aspects, when phenol constitutes at least 60 wt % of the phenolic compound present among the reactant components, the fatty acid constitutes at least 5 wt %, or at least 10 wt %, or at least 15 wt %, or at least 20 wt %, or at least 25 wt %, or at least 30 wt %, or at least 40 wt % of the reactant components. In other aspects, when phenol constitutes at least 55 wt % of the phenolic compound present among the reactant components, the fatty acid constitutes at least 5 wt %, or at least 10 wt %, or at least 15 wt %, or at least 20 wt %, or at least 25 wt %, or at least 30 wt %, or at least 40 wt % of the reactant components. In other aspects, when phenol constitutes at least 35 wt % of the phenolic compound present among the reactant components, the fatty acid constitutes at least 5 wt %, or at least 10 wt %, or at least 15 wt %, or at least 20 wt %, or at least 25 wt %, or at least 30 wt %, or at least 40 wt % of the reactant components. In other aspects, when phenol constitutes at least 25 wt % of the phenolic compound present among the reactant components, the fatty acid constitutes at least 5 wt %, or at least 10 wt %, or at least 15 wt %, or at least 20 wt %, or at least 25 wt %, or at least 30 wt %, or at least 40 wt % of the reactant components. In each of these many aspects, the invention optionally provides that Monomer constitutes 100%, or 90%, or 80%, or 70%, or 60%, or 50%, or 40%, or 30%, or 20%, or 10% of the total weight of the fatty acid.

Aldehyde

The aldehyde of the present invention is reactive with rosin and phenol, to produce crosslinked resinous adducts. Exemplary aldehydes of the present invention include, without limitation, formaldehyde, paraformaldehyde, acetaldehyde, glyceraldehyde, butyraldehyde, isobutyraldehyde, benzaldehyde, furfural, and glyoxal.

In various aspects of the present invention, aldehyde is up to 40%, or up to 30%, or up to 20%, or up to 5%, or 2-40%, or 2-30%, or 2-20%, or 2-15%, or 3-40%, or 3-30%, or 3-20%, or 3-15%, or 4-40%, or 4-30%, or 4-20%, or 4-15%, of the total weight of the components used to from the resin. Paraformaldehyde is a preferred aldehyde to be used as a resin-forming component, and it is preferably used at about 4-12 wt % of the resin-forming components, The term "formaldehyde" is used herein to include both formaldehyde and paraformaldehyde.

Phenolic Resin

In an optional aspect, the phenolic compound is pre-reacted with the aldehyde, so as to provide a so-called phenolic resin. Thus, phenolic compound and aldehyde may be added to the resin-forming reaction mixture in the form of a phenolic resin, rather than, or in addition to, the two individual reactants.

Polyol

In an optional aspect, the components used to form a resin of the present invention further comprise polyol. Polyols of the present invention are reactive with acidic moieties via standard esterification reactions, and are reactive with ester moieties via standard transesterification reactions, to produce crosslinked resinous adducts. Exemplary polyols include, without limitation, alkylene glycol (such as ethylene glycol and propylene glycol), polyalkylene glycol (such as polyethylene glycol and polypropylene glycol), alkylene triol (such as glycerol, trimethylolethane, and trimethylolpropane), tetrafunctional alcohols such as pentaerythritol, pentafunctional alcohols such as dimerized trimethylolpropane, or hexafunctional alcohols such as dimerized pentaerythritol, where a preferred polyol of the present invention is pentaerythritol.

When polyol is desirably included as a component in a resin-forming reaction, one option is to provide the polyol via a polyester of the polyol and fatty acid. The polyester, upon transesterification with other reactants, provides not only some or all of the polyol, but also provides some or all of the fatty acid. Accordingly, the polyol may be introduced to the reaction mixture via an ester of the polyol. Likewise, the fatty acid may be introduced to the reaction mixture via an ester of the fatty acid. In one embodiment of the invention, polyester is utilized as a reaction component to provide both polyol and fatty acid. In this embodiment of the invention, the polyester is preferably a triglyceride, e.g., a vegetable oil.

In various optional aspects of the present invention, polyol (optionally incorporated into a polyester form) is up to 25%, or up to 20%, or up to 15%, or up to 10%, or 1-25%, or 1-20%, or 1-15%, or 1-10%, or 2-25%, or 2-20%, or 2-15%, or 2-10%, or 3-25%, or 3-20%, or 3-15%, or 3-10%, or 4-25%, or 4-20%, or 4-15%, or 4-10% of the total weight of the components used to form the resin.

α,β-Olefinically Unsaturated Carbonyl Compound

In another optional aspect, the components used to form a resin of the present invention further comprise α,β-olefinically unsaturated carbonyl compound. The α,β-olefinically unsaturated carbonyl compound of the present invention has an olefinic unsaturation adjacent to the carbon atom of a carboxyl group, i.e., has the —C=C—C(=O)—O— arrangement of carbon and oxygen atoms. The α,β-olefinically unsaturated carbonyl compound is reactive with rosin and resin acids, to form adducts. When the α,β-olefinically unsaturated carbonyl compound is maleic anhydride, the adduct between rosin and maleic acid is known as maleic rosin. When the α,β-olefinically unsaturated carbonyl compound is fumaric acid, or an ester of fumaric acid, then the corresponding adduct formed between rosin and fumaric acid or a fumarate is known as fumarated rosin.

Suitable α,β-olefinically unsaturated carbonyl compounds include maleic anhydride, fumaric acid, mono ($C_1$-$C_{12}$alkyl) ester of fumaric acid, di($C_1$-$C_{12}$alkyl) ester of fumaric acid, acrylic acid, $C_1$-$C_{12}$alkyl ester of acrylic acid, methacrylic acid, $C_1$-$C_{12}$alkyl ester of methacrylic acid, itaconic acid, and $C_1$-$C_{12}$alkyl ester of itaconic acid. Maleic anhydride, fumaric acid and esters of fumaric acid are preferred α,β-olefinically unsaturated carbonyl compounds, with maleic anhydride being most preferred.

In various optional aspects of the present invention, α,β-olefinically unsaturated carbonyl compound is up to 15%, or up to 10%, or up to 8%, or up to 5%, or 0.1-15%, or 0.1-10%, or 0.1-8%, or 0.1-5%, or 0.5-15%, or 0.5-10%, or 0.5-8%, or 0.5-5%, or 1-15%, or 1-10%, or 1-8%, or 1-5% of the total weight of the resin-forming components. When it is present, the α,β-olefinically unsaturated carbonyl compound is preferably maleic anhydride, and it is preferably utilized at a concentration of 2-4 wt % of the total weight of the resin-forming components.

Alkaline Metal Salt

In another optional aspect, the components used to form a resin of the present invention comprise an alkaline metal salt. The metal salt is desirably present in the reaction mixture as a catalyst for the phenol-aldehyde polymerization. However, the metal salt may also, or alternatively, react with the rosin so as to form resinate, where the term "resinate" refers to a rosin (which is a carboxylic acid-containing material) in the form of a salt, i.e., a carboxylic acid salt. Thus, in one aspect of the resin composition of the present invention, alkaline metal salt is combined with rosin, which reacts with carboxylic acid moiety present in the resin acid components of rosin to produce metal carboxylate functionalities. Such treatment renders the resulting resinate composition readily soluble in organic solvent, and also increases the melting point of the rosin.

In the present invention, the cation of the alkaline metal salt is preferably divalent, i.e., carries a charge of +2. Rosin salts of divalent cations of zinc, magnesium, and calcium have particularly good pigment wetting properties, and are preferred in the resinates of the present invention. More preferably, the cation of the alkaline metal salt is divalent magnesium cation. Said salts may be the acetate, carbonate, bicarbonate, formate, hydroxide, oxalate or oxide of a metal. Magnesium salts (including without limitation, magnesium oxide and magnesium hydroxide) are further preferred.

In various aspects of the present invention, alkaline metal salt is up to about 5%, or 4%, or 3%, or 2%, or 1%, or 0.5% of the total weight of the resin composition.

Solvent

One or more inert solvents may be included with, i.e., be in admixture with, the components used to form a resin of the invention. However, solvent is not construed to be a "component" of the reaction mixture, since it does not participate in the resin-forming reaction. Nevertheless, it may be convenient to include one or more solvents in the reaction vessel, where hydrocarbons, e.g., xylenes, are an exemplary solvent.

Process of Manufacture

The present invention provides a resin produced by a process as described herein. The process includes reacting rosin, fatty acid, phenolic compound and aldehyde. These components, and possibly optional components, are reacted together at elevated temperature so as to form a resin. In order for the components of the reaction mixture to undergo a resin-forming reaction, combinations of the components must be exposed to an elevated temperature in the range of about 80-300° C. At these elevated temperatures, the components undergo covalent bond-forming reactions with other components, so that some increased molecular weight material is formed.

There are different orders in which the components may be charged to a reaction vessel. For example, each of the components may be combined together in a single reaction vessel, and the combination taken to elevated temperature so that the components react with one another to form a resin of the invention. This approach may be termed the "one-pot" reaction process. Alternatively, two or more (but less than all) components may be combined in a single reaction vessel, and this combination taken to elevated temperature so that the components react with one another to form an intermediate reaction product. Then other components are reacted with the intermediate reaction product, where these "other components" may be added individually to the reaction vessel, or two or more of them may be pre-reacted with each other before the pre-reaction reaction product is added to the reaction mixture.

For example, the rosin and fatty acid may be combined and heated, during which process these two components will form a fluid mixture. The resulting reaction mixture can then be combined with the other reaction components (e.g., phenolic compound and/or aldehyde and/or α,β-unsaturated carbonyl compound and/or polyol, as well as other optional components such as alkaline metal salt), and the complete admixture formed either instantaneously, or in stepwise fashion, to allow intermediate reactions to occur with minimal interference. The resulting reaction mixture may alternatively be combined with a reaction product of two or more of phenolic compound, aldehyde, α,β-unsaturated carbonyl compound and polyol, in addition to further ingredients. To complete the reaction process, the reaction mixture is taken to elevated temperature, typically between about 50° C. and about 310° C., preferably 120° C. to 310° C., under either normal (atmospheric) pressure or reduced pressure as may be achieved, e.g., using a vacuum source.

Thus, the invention provides that the components may be reacted with one another in any order, at temperatures within the range of 50-310° C., to obtain a resin of the invention. The present invention also provides that after reacting together components in a reaction mixture, an additional amount of one or more of said components may be added to said reaction mixture and further reacted together, a procedure commonly done in commercial resin production. It should be recognized that the same components (in terms of quantity and identity) may form resins with different properties, depending on the precise manner in which the components are reacted together. However, determining these properties is well within the skill of the ordinary artisan.

Elevated reaction temperatures are selected in view of the following points. The reaction temperature must be high enough that the contents of the reaction vessel are sufficiently fluid to allow those contents to be stirred. Higher temperatures are generally preferred for reasons of economy, in order to provide a faster rate of reaction. However, the reaction temperature should not be so great that the reaction components boil out of the reaction vessel. Nor should the temperature be so great that decomposition of the reaction components or reaction products should occur. The term "elevated" is used to indicate that standard room temperature, i.e., ca. 230° C., will not be hot enough to provide the fluid state needed for the reactants. At a minimum, the elevated reaction temperature must be about 50° C., and is preferably at least 100° C. A lower temperature may be utilized if a solvent is included within the reaction vessel.

The resin-forming reaction mixture may, and typically will contain water; furthermore, the resin-forming reaction generates water as a byproduct of the covalent bonds that are formed between members of the reaction components. In order to drive the reaction toward completion, this water should be removed from the reaction or product mixture. In the absence of vacuum or azeotrope formation, a reaction temperature of at least 100° C. is needed in order to distill water away from the reacting components. Thus, at least during the initial stage(s) of resinate or ester formation, the reaction temperature is desirably set to about 100-190° C. While a higher initial reaction temperature may be used, the consequence may be water generation at a rate that is much greater than water removal may be conveniently accomplished.

In order to drive the reaction to completion, removal of water may be enhanced through addition of an organic solvent that forms a low-boiling azeotrope with water, and/or the addition of a light vacuum on the reaction vessel. To provide a low-boiling azeotrope, an organic solvent that forms an azeotrope with water, e.g., toluene or xylene, can be added to the reaction vessel, and then removed by distillation, under normal pressure. However, in one aspect of the invention, azeotropic distillation is not used to remove water from the resin.

The reaction components are maintained at about 120-310° C. until the reaction is considered finished. Reaction progress is conveniently monitored by periodically taking samples of the reaction mixture and measuring one or more relevant properties of the sample. For example, initially the acid number of the reaction mixture may be as high as about 300. The acid number will gradually fall as the resin-forming reaction proceeds. Melting point (softening point), melt viscosity, solution viscosity and/or cloud point measurements may also be made to monitor reaction progress.

The amounts of the various reactants are preferably selected so that the reaction mixture does not form a gel during the heating process. This is particularly important when the reaction mixture contains multifunctional reactants, e.g., maleic anhydride and pentaerythritol. However, gelling can also occur when only rosin, fatty acid, aldehyde and phenolic compound are used to form the resin. The Examples contained herein provide several formulations that do not gel. For example, a mixture of about 60 wt % gum rosin, ca. 15 wt % phenol, ca. 15 wt % paraformaldehyde (91%), ca. 10 wt % Monomer, and a trace (ca. 0.5 wt %) magnesium oxide can be used to provide a fluid (when molten), rather than a gelled, resin. As another example, a mixture of about 45 wt % gum rosin, ca. 20 wt % tall oil rosin, ca. 8 wt % phenol, ca. 5 wt % paraformaldehyde (91%), ca. 10 wt % Monomer, ca. 2 wt % maleic anhydride, ca. 10 wt % pentaerythritol, and a trace (ca. 0.1 wt %) magnesium oxide can be used to provide a fluid (when molten), rather than a gelled, resin.

If a reaction mixture does get to an undesirable extent, then an adjustment should be made in the amount of one or more of the reaction components. One of ordinary skill in the art is familiar with the ability of some mixtures of rosin, fatty acid, phenolic compound and aldehyde, plus (optionally) maleic anhydride and polyol, to form a gelled mixture, and is readily able to adjust the formulation as needed to reduce the gelled component of the resin to an acceptably low level. To this end, a statistical design of experiments may be utilized to optimize a formulation for a particular end-use, e.g., gravure vs. lithographic ink resin. Since the resins of the invention preferably have a relatively high molecular weight, and accordingly have a relatively high solution viscosity, successful resin formulations are often close to those resin formulations that yield an undesirable amount of gelled resin.

Thus, in one aspect, the present invention provides a resin produced by a process, where the process includes reacting the following components: rosin, fatty acid, phenolic compound and aldehyde. In another aspect, the components include $\alpha,\beta$-olefinically unsaturated carbonyl compound. In another aspect, the components included polyol. In another aspect, the components include both $\alpha,\beta$-olefinically unsaturated carbonyl compound and polyol. The components are reacted at elevated temperature so as to form a resin, preferably a gel-free resin.

In another aspect, the present invention provides a resin produced by a process, where the process includes reacting the following components: rosin, monocarboxylic acid, phenolic compound, aldehyde, and polyol. These components are reacted at elevated temperature so as to form a resin. An exemplary product is formed by the process of reacting rosin, fatty acid and phenol at elevated temperature, optionally with addition of a reaction catalyst, followed by addition of paraformaldehyde, followed by the addition of polyol. However, other orders of combination of the components may also be employed to prepare a product of the present invention.

In another aspect, the present invention provides a resin produced by a process, where the process includes reacting the following components: rosin, fatty acid, phenolic compound, aldehyde, $\alpha,\beta$-olefinically unsaturated carbonyl compound, and polyol. These components are reacted at elevated temperature so as to form a resin. An exemplary product is formed by the process of reacting rosin, fatty acid and phenol at elevated temperature, optionally with addition of a reaction catalyst, followed by addition of paraformaldehyde, followed by the addition of $\alpha,\beta$-olefinically unsaturated carbonyl compound, followed by the addition of polyol. However, other orders of combination of the components may also be employed to prepare a product of the present invention, as described below.

In a preferred aspect, the process for preparing a resin of the present invention comprises the ordered steps of:

a) heating rosin in a reaction vessel, optionally at about 140-180° C., optionally in admixture with monocarboxylic acid and phenolic compound, until a homogeneous molten liquid is formed;

b) further charging the reaction vessel with, if not present, monocarboxylic acid and phenolic compound, then allowing the reaction mixture to react, optionally at about 100-140° C., optionally for up to about 60 minutes;

c) further charging the reaction vessel with aldehyde, then allowing the reaction mixture to react, optionally at about 100-180° C., optionally for up to about 300 minutes;

d) further optionally charging the reaction vessel with $\alpha,\beta$-olefinically unsaturated carbonyl compound, then allowing the reaction mixture to react, optionally at about 120-250° C., optionally for up to about 150 minutes;

e) further optionally charging the reaction vessel with polyol, then allowing the reaction mixture to react, optionally at about 120-310° C., optionally for up to about 48 hours.

In an optional aspect, the process for preparing a resin further comprises charging the reaction vessel with alkaline metal salt wherein the cation of said salt is divalent. The salt may be added after formation of the homogeneous molten liquid. Thus, the present invention provides that for each of the processes and reaction mixture described herein, metal salt may be added to the components to provide a resin of the present invention.

Resin Properties

The resins of the present invention may be characterized by their properties, which include acid number, melting point, molecular weight distribution and solubility. These properties are routinely measured for ink resins, and thus one of ordinary skill in the art is very familiar with techniques to measure these properties. Nevertheless, a brief description of suitable techniques to measure certain of these properties is provided here.

Acid number is measured by dissolving a known weight of resin (e.g., 1 gram) into an organic solvent (e.g., toluene is a typical solvent, however a 1:2 ratio weight ratio of isopropanol:toluene may be used if toluene alone does not dissolve the resin), and then titrating a measured amount of methanolic potassium hydroxide (e.g., 0.1 N methanol KOH) solution into the resin solution. The titration is complete when a pH of about 7 is attained. This endpoint can be seen by including phenolphthalein in the solution, where the endpoint occurs when a faint pink color persists for at least 15 seconds. The acid number of the resin is equal to the amount of KOH, in mg, which was used in the titration, divided by the weight of resin, in grams, in the sample that was titrated. In other words, acid number is equal to the mg of KOH needed to neutralize 1 gram of sample.

In various optional aspects of the present invention, the acid number of the resin composition is less than about 70, or less than about 60, or less than about 50, or less than about 30; or about 1-70, or 1-50, or 1-60, or 1-50, or 1-30, or 5-50, or 5-40, or 5-30, or 10-70, or 10-60, or 10-50, or 10-40, or 15-70, or 15-60, or 15-50, or 15-40. For a resin intended for a lithographic ink formulation, the acid number of the resin is preferably about 20. When the resin is intended for a gravure ink formulation, the resin preferably has an acid number of about 45.

Melting point, which may also be referred to as "softening point," may be measured by the so-called 'ring and ball' method, which is the subject of ASTM E28. Alternatively, a softening point value may be obtained using a softening point instrument from Mettler Laboratories (Hightstown, N.J., USA). The melting point values described and reported herein were obtained using a Mettler FP90/FP83HT Cup and Ball apparatus, according to the following procedure: A 2.80 mm bottom orifice sample cup is filled with the molten resin to be tested. The excess resin is removed to give a flat surface. The solid resin should be free of bubbles. The sample cup is placed in the cartridge with the lead ball (3.4±0.2 gram) centered on top of the sample and the cartridge is placed in the furnace. The following conditions are used: start temperature is 20-25° C. below the expected softening point, heating rate of 1.5° C./min. Results reported in ° C. According to this procedure, a resin of the present invention preferably has a softening point in excess of 120° C., e.g., 120-200° C., and more preferably has a softening point of about 145° C.

A resin of the present invention may be characterized in terms of its molecular weight, where molecular weight is conveniently measured using gel permeation chromatography (GPC). GPC analysis may be performed using a Waters model 515 pump (Waters Instruments, Plymouth, Minn., USA; www.wtrs.com), Waters model 717 auto injector and Waters 410 differential refractive index (RI) detector. The components were eluted with tetrahydrofuran (THF) through a row of 3 Polymer Labs (Polymer Laboratories, Amherst, Mass., USA; www.polymerlabs.com) mixed-B GPC columns. Molecular weight was determined by comparison of retentions times to a column calibrated with polystyrene standards. Under these conditions, a preferred resin of the present invention has a peak molecular weight within the range of 30,000-500,000, more preferably about 200,000.

A resin of the invention may be characterized in terms of its solution form. In other words, a solution of the resin in a suitable solvent is prepared, and this solution is characterized in order to evaluate the quality of the resin. The solution may be referred to as a varnish, where the varnish may be used to prepare an ink. The following procedure may be used to prepare a solution (varnish) containing a resin of the present invention, where the varnish itself is an aspect of the present invention. The device used in this procedure is called a "Thermotronic", and it is available from Testprint, Inc. (Cherry Hill, N.J., USA; www.testprint.com).

The resin is crushed under mechanical force, and the crushed resin and a test solvent are weighed into a metal Thermotronic test tube for a total sample size of 50 grams. The varnish is typically prepared at a resin solids concentration of 35-50 wt %, preferably about 45 wt %. The tube is placed in the Thermotronic and a PT-100 temperature probe is inserted. The Thermotronic controllably heats the solution using the following parameters: stirring speed (RPM) 120; heating rate (° C./minute) 35; top temperature (° C.) ca. 180-230 C; hold time (minutes) ca. 2-10; cooling rate (° C./minute) 20. Suitable solvents for this purpose include M47, TXIB, ARLO, and N40HT, where M47 is MAGIESOL™ M-47, a "technical white oil," from Magie Brothers, Franklin Park, Ill., presently a division of Pennzoil Products Company; TXIB is a plasticizer ester of the chemical name 2,2,4-trimethyl-1,3-pentanediol diisobutyrate sold by Eastman Chemical, Kingsport, Tenn.; ARLO is Alkali Refined Lindseed Oil, a commodity chemical; and N40HT is a specific hydrotreated naphthenic petroleum oil (Chemical Abstract Service Registry No. 64742-53-6), where many members of this family of oil are commercially available (see, e.g., San Joaquin Refining Co., Inc. Bakersfield, Calif., USA). Two other suitable solvents are the printing ink distillates known as PKWF® and PRINTOSOL® solvents, both available from Haltermann Products (a subsidiary of the Dow Company, Channelview, Tex., USA; www.haltermann.com). PKWF® 6/9 AR is a low aromatics (<=1%) hydrocarbon having a distillation range of 260-290° C. at 1013 kPa (per ASTM D 4052). The solvents may be blended together if desired, e.g., 1:1 M47 and TXIB may be used as the solvent.

Inks and Varnishes

The present invention provides solutions of the ink resins of the present invention, including solutions intended to be components of ink formulations, where these later solutions are commonly known as varnishes. Varnishes useful in gravure and lithographic inks may be characterized in terms of their viscosity, tan delta, and cloud point, among other properties known to one of ordinary skill in the art. Varnishes for evaluation purposes, such as for rheological evaluation, may be prepared using the Thermotronic device described above.

Rheology flow measurements can be made on a varnish of the present invention. This measurement can be performed using a TA Instruments (New Castle, Del., USA; www.tainst.com) AR-1000N rheometer in flow mode at 25° C. using a 4 cm 1° cone set at the geometric gap. A shear rate of 25 $s^{-1}$ is applied for 1 minute with 50 measurement points collected. The final measurement point is taken as the flow viscosity and is reported in Pa·s. Under these conditions, a 45 wt % PKWF 6/9 AR solution of a resin of the present invention preferably has a flow viscosity of 0.1 to 450 Pa·s., or 0.5 to 450 Pa·s., or 5 to 450 Pa·s., or 0.1 to 150 Pa·s., or 0.5 to 150 Pa·s., or 5 to 150 Pa·s. In one aspect, a varnish of the solution has a flow viscosity of about 5 to 150 Pa·s. for a resin intended for a lithographic ink. In one aspect, the flow viscosity of the varnish is 20-80 Pa·s.

Rheology frequency sweep measurements may be used to determine the tan delta of a varnish of the present invention. This measurement is made by determining the rheology of the resin solution with a TA Instruments AR-1000N rheometer in oscillation mode at 25° C. using a 4 cm 1° cone set at the geometric gap. A frequency of 1 Hz is applied using a controlled strain of 0.10. A temperature sweep is made between 10° C. and 60° C. over 15 minutes. Tan Delta, G' (Dynes s$^{-1}$) and G" (Dynes s$^{-1}$) are reported at 23° C. A varnish of the present invention preferably has a tan delta of greater than 1.5, but more preferably has a tan delta of less than 5.

Cloud point may be measured in resin solutions according to standard methods ASTM D97 and SCAN T5:67. The present inventors prefer to determine cloud point using a Chemotronic Cloud Point Tester, available from Testprint, Inc. (Cherry Hill, N.J., USA; www.testprint.com). To measure cloud point, a sample of the resin is mechanically crushed, and 2.0 g of crushed resin and 18.0 g of the test solvent are weighed into a Chemotronic glass test tube. The tube is then placed in the Chemotronic and a PT-100 temperature probe is inserted. The Chemotronic heats the solution, cools automatically and reports cloud point in degrees C. The following parameters are used for all solvent systems: heat to top temperature of 230° C. at a typical rate of 40° C./min, hold at 230° C. for 2 minutes, then cool at a typical rate of 40° C./minute.

Under these conditions, a clear solution is preferably produced at a temperature within the range of 25-180° C. For lithographic printing, the cloud point of the resin may be used as a guide to determine the type of ink the resin is well suited for. For example, if the cloud point is low, i.e., ca. 25° C., then the resin has very good aliphatic solubility and may be used for pigment wetting. If the cloud point is in the mid-range, i.e., ca. 50-150° C., the resin may be particularly useful in heat set lithographic inks. If the cloud point is high, i.e., ca. 180° C., the resin may be particularly useful in inks for sheet fed lithography. For gravure printing, the cloud point of the resin is not particularly critical, and cloud points in the range of 75-180° C. are acceptable, where these cloud points are measured at ca. 10 wt % solids in a solvent. In one aspect, the resin of the present invention is completely soluble at 180° C. in mineral oil at a 10% resin solids concentration.

The present invention also provides an ink suitable for printing, such as gravure or lithographic printing. In gravure printing, a cylinder onto which is engraved or etched the image to be printed is rolled directly into ink and transferred directly to the substrate that accepts the printed image. Gravure printing is a very common commercial mode of printing, and is well known to one of ordinary skill in the art. Gravure printing is often used in printing on substrates such as magazine stock, metal foils, plastic films, and paper cartons.

A gravure ink of the present invention contains a resin as disclosed herein, in addition to a solvent, a colorant and optional performance-enhancing additives. The inventive resin can be used alone or in combination with co-resins. Suitable co-resins include commonly known co-resins such as, without limitation, rosin modified maleic and phenolic esters, hydrocarbon resins and alkyds. Owing to the lack of intermediary rollers and/or cylinders utilized in gravure printing, the ink used in gravure printing must be of very low viscosity and finely ground so as to reduce the amount of scratching imparted to the engraved or etched cylinder; yet, because of the relative absence of solvent-sensitive (i.e., rubber-composed) moving parts needed for said printing process, a wide range of solvents are acceptable for use in gravure printing. Suitable solvents include, without limitation, mineral oils, aromatic and ester solvents. Suitable colorants include flushed color, dry pigments and soluble dyes. Additives can include, without limitation, waxes, wetting agents, and plasticizers. In addition to the materials noted above, the ink additionally may contain any number of optional components, where the optional component(s) provide for improvements in the performance of the ink. Ink performance properties include color strength, gloss, scuff resistance, block resistance, misting, open time on press and many other properties.

The resins of the present invention are particularly useful as let down vehicles for gravure inks, e.g., publication gravure inks. Thus, a pigment dispersion may be prepared using a pigment and a solution resinate, where solution resonates are well known, commercially available products currently used for pigment grinding. After the pigment dispersion has reached a desired state, e.g., a desired average pigment particle size, the dispersion is diluted with a letdown vehicle. In addition to diluting the colorant, the letdown vehicle imparts various desirable properties to the ink. Desirable properties include gloss and scuff resistance. The rosin phenol resin of the present invention, dissolved in a suitable solvent such as toluene, can be used as a component of such a letdown vehicle. The rosin phenolic resin will typically be present at about 30-35% solids in such a vehicle. In one aspect the present invention provides a phenolic resin as described herein, in a varnish form.

Lithographic printing is a process whereby ink is transferred by rolling onto one or several additional cylinders before transferring ink onto the substrate, in contrast to gravure printing, where ink is directly transferred to the substrate. The lithographic printing process is such that ink is run in combination with an aqueous solution (known in the art as a fountain solution), the purpose of the fountain solution being to wet the parts of the substrate that do not receive ink. Lithographic printing is also a very common commercial mode of printing, used in printing on substrates such as packaging material, and is well known to one of ordinary skill in the art.

Lithographic printing is divided into two major types: sheet-offset, or printing on individual substrate sheets; and web-offset, or printing on continuous rolls of substrate. Each of these two major types is further divided into subclasses based on the mechanism of ink drying. Hence, the properties of a desirable lithographic ink binder are largely dependent on the specific type and subclass of printing employed. Some resin properties commonly desirable for essentially all types of lithographic printing include high melting point, high viscosity, good solubility in high-boiling low-solvency aliphatic solvents, good pigment wetting, and low pigment reactivity.

In one aspect, the resins of the present invention demonstrate self-gelling behavior. In other words, they do not require the presence of metal salt in order to gel a hydrocarbon solvent. Whether a resin is self-gelling can be determined using a viscometer, which can measure the viscoelasticity of a mixture of resin and solvent. In order to determine its viscoelasticity, a solution of resin and mineral oil is prepared by mixing the components for 30 minutes at 180° C. in a weight ratio of resin:mineral oil of 1:1.5. The mineral oil should have a boiling range of 240-270° C. and an aniline point of 72° C. (standard mineral oil PKW F 4/7, supplier: Haltermann). This mixture is cooled to room temperature, and the tan delta of the solution is measured using a viscometer. For instance, an oscillating rotary viscometer (RV 20/CV 100 apparatus from Haake using measuring device (cone) PK 20 at 23° C., a deflection angle of 10°, a frequency sweep of 0.05 to 5 Hz, and an angular velocity range (omega) of 1-10 $s^{-1}$ gives tan delta value of <5 for a self-gelling resin.

Printing ink may be prepared by adding colorant (flush color, dry pigment or soluble dyes), additives and additional solvent to a letdown varnish comprising a resinate composition of the present invention. Flush color is a form of pigment where the solvent used during the pigment manufacturing process (water) has been replaced by a hydrocarbon or oil based varnish. Such a varnish can contain the inventive or conventional resins, resinates, or a combination of both. Finished ink may be prepared by adding the flush color and the letdown varnish while mixing at low shear. The mixture can be passed through a bead mill or shot mill to further reduce pigment particle size and improve final ink properties. Soluble dyes can be added with little or no additional energy to impart color to the system. Additional varnish or solvent can be added to adjust tack, flow and viscosity to reach target specifications and then additives are blended in.

The following are some optional components may be included in an ink of the present invention. Blown Castor Oil (BCO) may be included at a level of 1-3 wt % in order to reduce the water pickup of the ink. Soy bean oil (SBO) is often used in inks in order to reduce their tack, and to increase the flowability of an ink, where a typical concentration is 1-10 wt %. Tung oil may be included in an ink formulation at a concentration of about 5-15 wt % in order increase the setting speed of an ink. Tung oil may also increase the hardness of the dried ink. Tung oil, like SBO, can also increase the flowability of an ink, and reduce its tack. Alkali Refined Linseed Oil (ARLO) is extracted from the seed of the flax plant, and consists largely of linolenic acid. ARLO can be used for cutting tack and body, increasing flow of overly "short" inks, and to enhance the film integrity of inks that contain metallic driers that can react with ARLO. The addition of Gelled Linseed Oil (GLO) to an ink is a convenient way to reduce the tack of a heavy ink, particularly sheetfed or web offset inks. Each of these oils is a commodity chemical and readily available from many commercial suppliers.

One of ordinary skill in the art is familiar with preparing printing inks using either flush color, dry pigment or soluble dyes, and may adopt other procedures for preparing such a printing ink using a resin of the present invention.

EXAMPLES

The invention is illustrated in more detail by the following examples. In the following examples, chemicals were of reagent grade unless noted otherwise, and were obtained from commercial supply houses such as Aldrich Chemical Co. (Milwaukee, Wis.). SYLVAROS™ 85 tall oil rosin, SYLFAT™ 2S tall oil fatty acid, and CENTURY MO6™ Monomer are available from Arizona Chemical (Jacksonville, Fla.). Chinese gum rosin is available from sources such as BFB Enterprises (Panama City Beach, Fla.). Test oils 6/9 and 6/9 AR are mineral oils available from Haltermann Products (Channelview, Tex.). When a value is recited such as "45% AR", this refers to a solution of the resin in 6/9 AR test oil, at 45 wt % solids (100× weight of resin divided by the sum of the weights of the resin and the solvent).

Example 1

Rosin Modified Phenolic Ester

As summarized in TABLE 1, a reaction vessel was charged with Chinese gum rosin, CENTURY MO6™ Monomer, and phenol, and heated to about 150-170° C. After the mixture was molten, the vessel was further charged with magnesium oxide catalyst (dispersed in about 15 grams xylene), and the resulting admixture was cooled to about 110° C. The reaction vessel was charged with 91% paraformaldehyde, and the resulting admixture was refluxed at about 120° C. for about 90 minutes, before heating to about 270° C. (@ 35° C./hr) to allow removal of condensed water and drive the reaction to completion.

TABLE I

Composition Of Rosin Monomer Phenolic Resin

| CAS No. | Component | Weight Percent |
| --- | --- | --- |
| 8050-09-7 | Chinese Gum Rosin | 58.16 |
| 108-95-2 | Phenol | 14.54 |
| 30525-89-4 | Paraformaldehyde, 91% | 15.31 |
| 68955-98-6 | CENTURY MO6 ™ Monomer | 11.63 |
| 1309-48-4 | Magnesium Oxide | 0.36 |
| | Total charge (grams): | 825.36 |
| | Final Softening point (° C.): | 155 |
| | Final Acid Number (mg KOH/g): | 56 |

Examples 2-4

Rosin Modified Phenolic Ester

These examples describe the preparation of rosin modified phenolic esters suitable for use in lithographic varnish manufacture, according to the weight percentages indicated in TABLE 2.

A reaction vessel was charged with Chinese gum rosin, tall oil rosin, CENTURY MO6™ Monomer, and phenol, and heated to about 150-170° C. After melting the rosin, the vessel was further charged with magnesium oxide catalyst (dispersed in about 10 grams xylene), and the resulting admixture was cooled to about 110° C. The reaction vessel was then further charged with 91% paraformaldehyde, the resulting admixture was allowed to reflux at about 110-120° C. for about 90 minutes, before heating to about 155° C. to allow removal of condensed water. The reaction vessel was then further charged with maleic anhydride, and the resulting admixture was heated to 210° C. The reaction vessel was then further charged with mono-pentaerythritol, and the resulting admixture was heated to about 270° C., to allow removal of water produced from esterification. The reaction product was sampled hourly at 270° C. for viscosity in mineral oil and cloud point from mineral oil solution. Optionally, the reaction mixture was held at about 150° C. overnight, before reheating the mixture to 270° C. and proceeding with sampling as above. Upon reaching the desired level of viscosity and solids, the reaction mixture was cooled to about 250° C. and discharged.

TABLE 2

Composition Of Rosin Modified Phenolic Ester

| | | Weight Percent | | |
|---|---|---|---|---|
| CAS No. | Component | Ex. 2 | Ex. 3 | Ex. 4 |
| 8050-09-7 | Chinese Gum Rosin | 43.85 | 47.48 | 44.2 |
| 8052-10-6 | SYLVAROS ™ 85 Tall Oil Rosin | 18.79 | 20.35 | 19.0 |
| 108-95-2 | Phenol | 8.50 | 5.52 | 8.6 |
| 30525-89-4 | Paraformaldehyde, 91% | 6.94 | 4.50 | 7.0 |
| 68955-98-6 | CENTURY MO6 ™ Monomer | 11.33 | 7.01 | 10.6 |
| 1309-48-4 | Magnesium Oxide | 0.15 | 0.11 | 0.1 |
| 108-31-6 | Maleic Anhydride | 1.22 | 3.78 | 1.2 |
| 115-77-5 | Mono-Pentaerythritol | 9.22 | 11.26 | 9.2 |
| | Total charge (grams): | 2472 | 1141.6 | 1225 |
| | Final Softening Point (° C.): | 130 | 150 | 138 |
| | Final Viscosity 45% AR (Pa·s): | 37.9 | 32.2 | 42.2 |
| | Rheology Tan delta, 23° C., 45% AR: | 5.186 | n.d. | 5.522 |
| | Final Cloud Point (° C.): | 109 | 126 | 119 |
| | Final Acid Number (mg KOH/g): | 19.3 | 20.3 | 22.3 |

Example 5

Rosin Modified Phenolic Ester

Following essentially the same procedure as set forth in Examples 1-4, the reactants of TABLE 3 where charged to a reaction vessel.

TABLE 3

Resin-Forming Reaction Mixture

| | Weight | Weight % |
|---|---|---|
| Gum Rosin | 487.8 g | 43.1% |
| Tall Oil Rosin | 209 g | 18.5% |
| Monomer | 144 g | 12.7% |
| Phenol | 94.5 g | 8.4% |
| MgO | 1.6 g | 0.2% |
| Paraform | 86.2 | 7.6% |
| Maleic Anhydride | 7.8 g | 0.7% |
| Pentaerythritol | 100.5 g | 8.8% |
| Total Charge | 1,131.4 g | 100% |

The resin of Example 5 had a cloud point as measured at 10 wt % in test oil of 105° C., a viscosity at 23° C. as measured for a 45 wt % solution in test oil of 26.2 Pascal, and an acid value of 20.6.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A process for preparing a resin, the process comprising reacting components at elevated temperature, the components comprising rosin, a fatty acid source, aldehyde and phenolic compound, wherein said fatty acid source consists essentially of Tall Oil Fatty Acids, and where phenol constitutes at least 25 wt % of the phenolic compounds, wherein the resin comprises a melting point from 120.degree.C. to 200.degree.C. and an acid number greater than 50 and less than 70.

2. The process of claim 1 wherein phenol constitutes at least 35 wt % of the phenolic compounds.

3. The process of claim 1 wherein phenol constitutes at least 55 wt % of the phenolic compounds.

4. The process of claim 1 wherein the rosin constitutes up to 85 wt % of the components.

5. The process of claim 1 wherein the fatty acid source constitutes up to 65 wt % of the components.

6. The process of claim 1 wherein the aldehyde constitutes up to 40 wt % of the components.

7. The process of claim 1 wherein phenolic compound(s) including phenol constitute up to 50 wt % of the components.

8. The process of claim 1 wherein the aldehyde component comprises formaldehyde.

9. The process of claim 1 wherein the rosin component comprises gum rosin.

10. The process of claim 1 wherein the components further comprise polyol.

11. The process of claim 10 wherein the polyol component constitutes up to 15 wt % of the components.

12. The process of claim 1 wherein the components further comprise an .alpha.,.beta.-unsaturated carbonyl compound.

13. The process of claim 12 wherein the .alpha.,.beta.-unsaturated carbonyl compound constitutes up to 8 wt % of the components.

14. The process of claim 1 wherein the resin is self-gelling in mineral oil at resin:mineral oil weight ratio of 1:1.5.

15. The process of claim 1 wherein the resin is completely soluble in mineral oil at 10% solids at 180.degree.C.

16. The process of claim 1 wherein the resin has a softening point in excess of 120.degree.C.

17. The process of claim 1 wherein a 45 wt % solution of the resin in a hydrocarbon solvent has a flow viscosity at 25.degree.C. of 0.1 to 150 pascal-seconds.

18. The process of claim 1 wherein the resin is suitable for use as a lithographic ink resin.

19. The process of claim 1 wherein the resin is suitable for use as a gravure ink resin.

20. The process of claim 1 wherein azeotropic distillation is not used to remove water from the resin.

21. The process of claim 1 wherein an inert organic solvent capable of azeotropic distillation of water at the elevated temperature is not used as an entraining agent for azeotropic distillation of water.

22. An oil-soluble resin prepared by the process of any of claim 1-7 or 8-21.

23. A varnish comprising an oil-soluble resin prepared by the process of any of claim 1-7 or 8-22, and a solvent.

24. The varnish of claim 23 wherein the solvent is a hydrocarbon.

25. A lithographic ink comprising a resin of claim 22.

26. A gravure ink comprising a resin of claim 22.

27. A process for preparing an oil-soluble resin, the process comprising reacting components at elevated temperature, the components comprising rosin, aldehyde, phenolic compound and a fatty acid source consisting essentially of the fraction of the distillation product of the acid clay catalyzed polymerization product of Tall Oil Fatty Acid that is highly enriched in monomeric fatty acids, where the fatty acid source constitutes at least 30 wt % of the components,
   wherein the oil-soluble resin comprises a melting point from 120.degree.C. to 200.degree.C. and an acid number greater than 50 and less than 70.

* * * * *